United States Patent [19]

Von Klock et al.

[11] Patent Number: 5,106,507
[45] Date of Patent: Apr. 21, 1992

[54] METHOD FOR RECOVERING HYDROCARBON CONTAMINANTS FROM WASTEWATER

[75] Inventors: Byron Von Klock; Rahul S. Patel, both of Beaumont, Tex.

[73] Assignee: Texaco Inc., White Plains, N.Y.

[21] Appl. No.: 699,285

[22] Filed: May 13, 1991

[51] Int. Cl.$^5$ .............................................. C02F 1/20
[52] U.S. Cl. ..................................... 210/664; 210/805; 210/266; 210/767
[58] Field of Search .................. 55/74, 89, 259.1, 259; 210/767, 805, 194, 218, 221.2, 259, 266, 664; 261/96, 151

[56] References Cited

U.S. PATENT DOCUMENTS

| | | | |
|---|---|---|---|
| 3,864,450 | 2/1975 | Takeyama et al. | 423/239 |
| 3,888,760 | 6/1975 | Ebert | 208/48 |
| 4,054,429 | 10/1977 | Ostojic et al. | 55/48 |
| 4,495,056 | 1/1985 | Venardos et al. | 208/11 |
| 4,684,457 | 8/1987 | McKechnie et al. | 208/188 |
| 4,755,499 | 7/1988 | Neal et al. | 502/415 |
| 4,871,450 | 10/1989 | Goodrich et al. | 210/151 |
| 4,895,641 | 1/1990 | Briceno et al. | 208/286 |

Primary Examiner—Frank Spear
Attorney, Agent, or Firm—Jack H. Park; Kenneth R. Priem; Richard A. Morgan

[57] ABSTRACT

A method has been discovered for recovering hydrocarbon contaminants from wastewater. The wastewater is contacted countercurrently with stripping gas. The stripping gas is passed over a bed of activated carbon to remove hydrocarbon contaminants. Periodically, the activated carbon bed is regenerated with steam. Steam condensate and hydrocarbon contaminants are passed to a petroleum desalter. Hydrocarbon contaminants are transferred to the petroleum.

10 Claims, 1 Drawing Sheet

METHOD FOR RECOVERING HYDROCARBON CONTAMINANTS FROM WASTEWATER

CROSS-REFERENCE TO RELATED APPLICATION

This application is related to application Ser. No. 07/607,948 filed Nov. 1, 1990 for Method And Apparatus For Stripping Contaminants From Wastewater to Klock et al.

BACKGROUND OF THE INVENTION

1. Field of the Invention

The invention relates to environmental pollution control. More particularly, the invention relates to a method for removing and recovering volatile contaminants from wastewater.

2. Description of Other Relevant Methods in the Field

A number of methods have been developed to remove volatile contaminants such as hydrocarbons from chemical plant and refinery wastewater i order to render it safe for discharge into the surface and ground water supply. The development of these methods has been driven by the discovery that water sources proximate to industrial areas have become contaminated with volatile organic compounds such as benzene, toluene, chlorinated and halogenated solvents and other compounds derived from petroleum.

A common method used in the petroleum industry for removing volatile organic compounds from wastewater has been to air strip the wastewater in a packed tower. Stripping is carried out in a vertically oriented tower at atmosphere pressure. Contaminated wastewater is pumped into the upper portion of the packed tower and cascades downwardly through liquid-gas contacting media referred to in the art as packing. In the alternative, a series of contacting trays may be substituted for the packing. Air is forced upwardly through the packing by means of a blower or fan to volatilize organic compounds. The contaminant free wastewater is collected at the bottom of the tower and is removed for disposal consistent with any remaining contamination. The contaminant laden air is released from the top of the tower to the atmosphere. In the alternative, the air is collected and purified to reduce hydrocarbon content before release to the atmosphere.

A number of methods have been developed for separating hydrocarbon for pollution control. U.S. Pat. No. 4,054,429 to N. Ostojic et al. teaches a method and apparatus for recovering solvent from a gas such as air. By the method, solvent contaminated air is passed through an oil absorber which absorbs the solvent, producing a clean air product. The oil-solvent mixture is stripped with inert gas to produce a solvent free oil. The remaining inert gas-oil mixture is separated by first condensing the oil and then passing the inert gas through an activated charcoal filter which removes last traces of solvent from the inert gas. Cleaned inert gas is returned to the stripper for recycle in the oil-solvent stripping stage.

U.S. Pat. No. 4,755,499 to L. G. Neal et al. teaches a sorbent for removing nitrogen oxides, sulfur oxides and hydrogen sulfide from gas streams. The sorbent comprises an alumina substrate having a pore volume between 0.4 and 0.8 cc/gm and an alkali or alkaline earth component.

U.S. Pat. No. 3,864,450 to T. Takeyama et al. teaches a sorbent for remaining nitrogen oxides from gaseous mixtures. The sorbent comprises carbon impregnated with sodium hydroxide or potassium hydroxide.

U.S. Pat. No. 4,495,056 to D. G. Venardos et al. teaches oil shale retorting and a retort water purification process. Retort water is steam stripped, carbon adsorbed and biologically treated followed by activated sludge treatment. The purified retort water is reused.

SUMMARY OF THE INVENTION

An improved method has been discovered for recovering volatile hydrocarbon compounds from a contaminated wastewater. The contaminated wastewater is passed to a stripping zone where it is stripped countercurrently with a stripping gas.

The countercurrent stripping transfers volatile hydrocarbon compounds to the stripping gas. A stripping gas-hydrocarbon mixture is withdrawn from the stripping zone and flowed to a recovery zone comprising a bed of adsorption media. Hydrocarbon is adsorbed on the adsorption media, thereby purifying the stripping gas.

In the improved method, the adsorption media is zone is suspended. Steam is flowed to the recovery zone and a steam condensate and hydrocarbon liquid is recovered. This liquid is mixed with crude petroleum. As a result, the hydrocarbon is recovered with the crude petroleum. Natural petroleum salts are removed with the water.

DETAILED DESCRIPTION OF THE DRAWINGS

Figure 1:
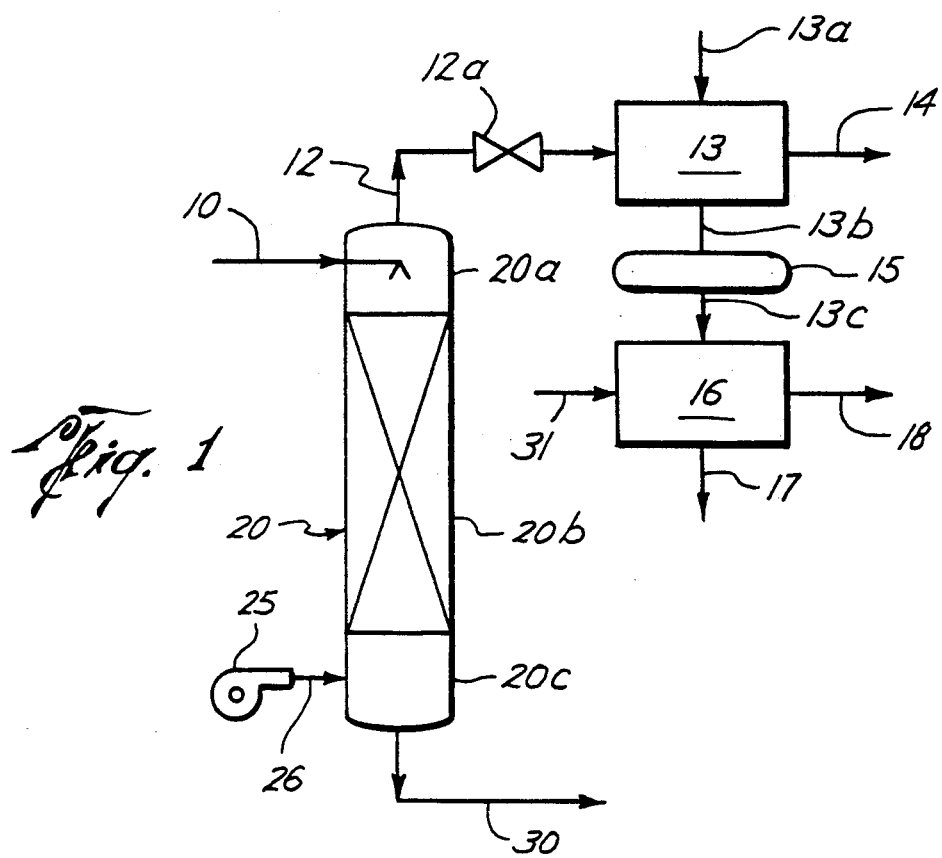
FIGS. 1 and 2 are schematic representations of methods for removing hydrocarbon contaminants from wastewater and recovering the hydrocarbons.
Figure 2:
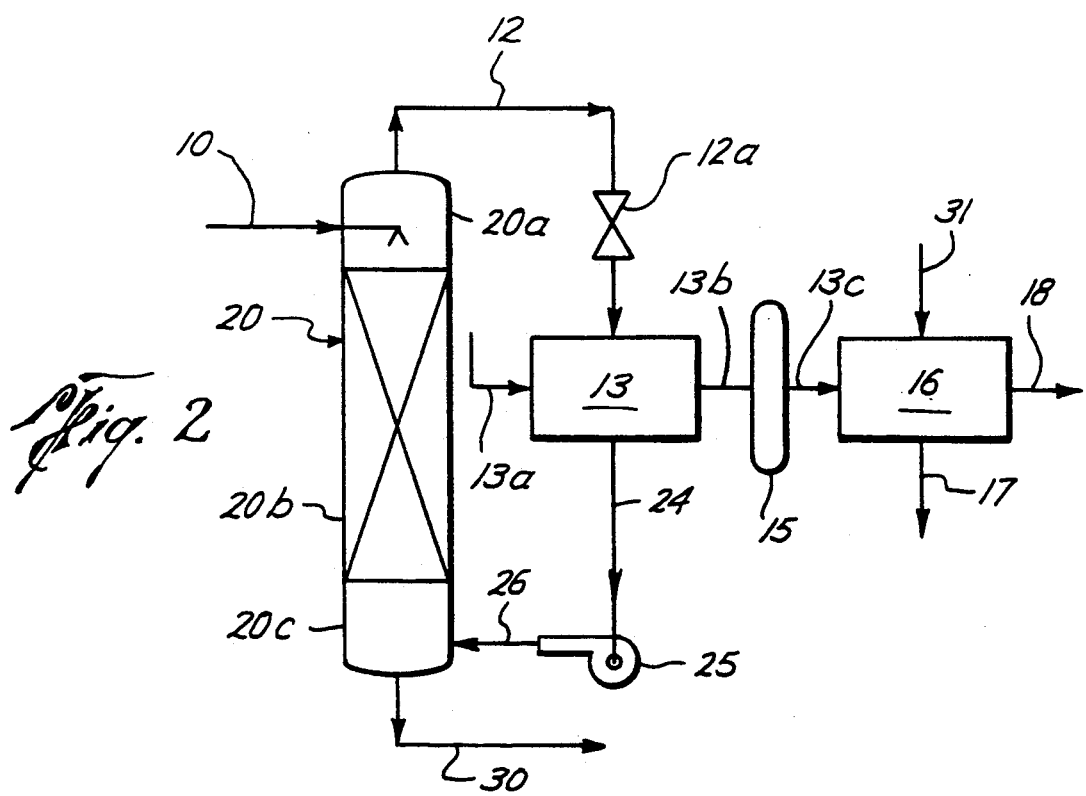

Reference is made to FIGS. 1 and 2 which are representative of a method for removing volatile hydrocarbon contaminants from wastewater. Wastewater is a general term which describes industrial water which is contaminated by any petroleum, coal, or shale oil derived material. The contaminants comprise low molecular weight hydrocarbons and other compounds which are quite soluble in water. Volatile hydrocarbon contaminants include benzene, toluene, xylene, ethers, ketones, gasoline, diesel fuel, light oils, aliphatic hydrocarbons, aromatic hydrocarbons and halogenated hydrocarbons such as trichloroethylene, tetrachloroethylene, carbon tetrachloride and the freons. Volatile inorganic compounds include ammonia, hydrogen sulfide and hydrogen cyanide. The amount of contamination is not critical. One hundred parts per million by volume is a common amount of contaminant, with much larger amounts not uncommon.

Wastewater, containing about 100 ppm dissolved volatile hydrocarbon is passed via line 10 to stripper vessel 20. Stripper vessel 20 is vertically oriented and has a height of 20 to 40 ft. and a diameter of 2 to 15 ft. sized for a wastewater rate through the vessel of about 5000 to 30,000 lb/sq.ft.-hr. The vessel 20 comprises three sections: an upper portion 20a, a medial contacting portion 20b and a lower portion 20c. The wastewater is distributed across the top of the upper portion 20a. A hydrocarbon contaminated stripping gas is also withdrawn from upper portion 20a via line 12. The hydrocarbon withdrawn via line 12 is essentially all of the hydrocarbon contained in the wastewater introduced via line 10. The material in line 12 is passed to a volatile contaminant recovery system 13 which comprises an activated carbon filter which removes about 95% of the hydrocarbon by adsorption. A stripping gas containing less than 200 ppm by volume hydrocarbon is vented to the atmosphere via line 14. A wastewater substantially reduced in volatile compounds is withdrawn via line 30.

FIG. 2 differs from FIG. 1 in the disposition of the hydrocarbon contaminated stripping gas, termed offgas, which is withdrawn via line 12. The material in line 12 is passed to volatile contaminant recovery system 13. About 95 vol % of the hydrocarbon is removed from the stripping gas, which is sufficient regeneration for reuse of the gas in the stripping operation. Regenerated stripping gas is passed via line 24 to blower 25. Blower 25 forces stripping gas into stripping vessel 20 via line 26. The stripping gas use, regeneration and recirculation is carried out in the absence of purging stripping gas to the atmosphere. Therefore, none of the contaminant hydrocarbon is vented to the atmosphere.

A blower 25 forces stripping gas via line 26 into the lower portion 20c of stripper vessel 20c. The stripping gas composition includes any of the chemically inert gases used for this purposes, e.g. air, nitrogen, carbon dioxide, methane, ethane, ethylene, propane, propylene, helium, hydrogen, neon, argon and mixtures thereof. Air is preferred. Blower 25 discharges gas at a rate of about 10 to 100 times the volumetric flow rate of wastewater. The stripping gas and wastewater are contacted countercurrently in medial contacting portion 20b at temperatures in the range of 40° F. to 150° F. and pressures of 0.98 to 2 atmospheres. In order to enhance the surface area for contacting portion 20b is filled with tower packing material. Packing consists of irregularly shaped material which provides passageways for gas and liquid to flow countercurrently through the entire length of the medial contacting portion. The surface area of the packing also provides area for thin film contacting of liquid and gas and the transfer of volatile hydrocarbon from the wastewater to the stripping gas.

In the alternative, contacting portion 20b may comprise trays designed for the contacting of liquids and gases such as bubble cap trays or value trays.

The transfer of volatile compounds from a water phase to a gas phase is mathematically described by Henry's Law. For the contacting of liquid water and gases, Henry's Law states that the partial vapor pressure of the volatile compound is equal to the concentration of the compound in the water phase multiplied by a Henry's Law constant. Perry's Chemical Engineers' Handbook 4th Ed. pp. 14-3 to 14-11 lists Henry's Law constants for common industrial systems and references Seidell, Landolt-Boernstein, *International Critical Tables*, Vol. 3, pp 371-381 for solubilities of gases in aqueous solutions.

The design of packed columns and tray columns for the gas stripping of contaminants from wastewater has become well quantified and design techniques are published in references such as op. cit. Perry's pp 18-3 to 18-51.

Volatile contaminant recovery system 13 is a bed of adsorbent media. A number of adsorbents are commercially available including activated carbon, silica gel, silica-based beads, activated bauxite and alumina and molecular sieve. Because of its tolerance to water, activated carbon is the preferred adsorbent media.

A preferred activated carbon has been discovered for carrying out the invention. The activated carbon is manufactured from bituminous coal and has a high working capacity. The activated carbon has a high adsorption capacity and low retentivity. Working capacity, expressed as wt % of activated carbon, is the adsorption capacity (ASTM D-3467) minus retentivity. Retentivity is the weight of volatile contaminant retained by the carbon after 6 hours of stripping with purified, dry air. These qualities make the activated carbon advantageous in both run length and working capacity. In a commercial process, carbon regeneration is carried out with steam. The rententivity of steam regenerated carbon correlates directly with the retentivity measured in the laboratory by dry air stripping.

The fired bituminous coal is granulated to a typical density of 27 lb/ft.$^3$ (0.42 g/cc) having a hardness number of 95 minimum. The resulting granules have a B.E.T. surface area of 1100 meter$^2$/gram minimum, an adsorption capacity (CTC) of 60 wt % to 65 wt % and a typical retentivity of 20 wt % to 26 wt %. This activated carbon is available commercially under the tradename KP-601 vapor phase activated carbon from Westates Carbon, Inc., Los Angeles, CA 90040. This low retentivity activated carbon has been found to be the best mode for carrying out the invention because it has a good working capacity for a full range of light and heavy wastewater contaminants.

A bed of activated carbon is sized using adsorption factors for the identified volatile compounds contained in the stripping gas. Based on these adsorption factors, an amount of activated carbon is used to give a convenient run length. In practice two beds of activated carbon are provided. While one bed is on line, the other bed is regenerated. Regeneration consists of passing hot regeneration steam through the bed at a temperature and for sufficient time based on experience to desorb contaminants. Steam is passed through the bed at a temperature of 220° F. to 300° F. for 1 to 6 hours to regenerate the activated carbon. The amount of steam is 1 to 10 lb. steam/lb. of activated carbon or less.

In the regeneration procedure, valve 12a is closed. Regeneration steam is passed via line 13a into recovery system 13. Regeneration steam causes the desorption of adsorbed hydrocarbon contaminants. Steam in line 13b condenses in condenser 15 and a steam condensate-hydrocarbon mixture flows out of the recovery system via line 13c to crude petroleum desalter 16.

When regeneration is completed, the activated carbon bed is returned to service and the other bed taken off line for regeneration. In this manner, fresh adsorbent is always available to decontaminate offgas.

Crude petroleum typically contains mineral salts such as sodium chloride, calcium salts and magnesium salts in amounts of 10 to 500 lbs. of mineral salts per 1000 barrels of crude petroleum. In order to remove these salts, crude petroleum is contacted and deliberately emulsified with, 1 to 10 vol %, typically 3 to 8 vol % of salt free water in a process referred to in the art as desalting. These ionic mineral salts have a greater affinity for low salinity water than they do for petroleum. As a result of contacting and emulsifying, the salts are transferred to the water. The water and petroleum phases are separated with the aid of emulsion breaking chemicals, eleectrostatic charge, heating and residence time. The water phase is removed from the desalter 16 via line 17. Crude petroleum is introduced to desalter 16 through line 31, and desalted petroleum is drawn off via line 18.

The crude petroleum useful for the invention is not critical. Arabian light and West Texas intermediate are preferred feedstocks in the petroleum refining industry because these light petroleums have a relatively low viscosity compared to other whole crudes. The viscosity of Arabian light petroleum is about 1.0 cp at 280° F. with a gravity of about 34.5° API. Other whole crude petroleums having a gravity between about 33° API and 36° API are also preferred because of their premium value due to low gravity.

Petroleum desalting processes are taught in U.S. Pat. Nos. 3,888,760; 4,684,457 and 4,895,641 incorporated herein by reference.

A petroleum desalter has been found to be a particularly advantageous disposition for hydrocarbon laden condensate. First, condensate is low in salinity making it effective for use in desalting. Second, the nonionic hydrocarbon in condensate has a greater affinity for crude petroleum than for water. Therefore, while the salts transfer to the water phase, the hydrocarbons transfer to the petroleum phase. Accordingly, one stage of wastewater processing is eliminated.

This invention is shown by way of example.

EXAMPLE

A hydrocarbon recovery process is carried out according to FIG. 1.

A 300 gpm wastewater stream containing 5.0 mg/L benzene and 20 mg/L of other volatile hydrocarbon is air stripped and the stripper offgas is passed to an activated carbon bed, where the hydrocarbon is adsorbed. The activated carbon was KP-601 vapor phase activated carbon from Westates Carbon Co., Los Angeles, CA 90040. After 24 hours, 17.645 lbs of benzene and 70.58 lbs of other hydrocarbon adsorb onto the carbon. The activated carbon bed is taken off line for regeneration. The carbon is regenerated for 1 hour with 1400 lbs of 50 psig steam at a temperature of 290° F. The contaminated steam is condensed at a temperature of 100° F. and a mixture of condensate and hydrocarbon is separated in a knockout drum. The mixture comprises 167 gallons water, 15.367 lbs benzene and 61.5 lbs other hydrocarbon. Additionally 0.278 lbs benzene is dissolved in the water.

In a desalter 1450 gallons per minute of crude oil is mixed with 70 gallons per minute of fresh water. The crude oil contains 4350.2 parts per million (ppm) benzene before desalting. After desalting the crude oil contains 4350.0 ppm benzene and the water contains 4.35 ppm benzene.

The condensed steam and hydrocarbon from the carbon regeneration are bled into the 70 gallons per minute desalter fresh water at a rate of 0.12 gallons per minute over a 24 hour period. The benzene and other hydrocarbon are transferred to the crude oil and recycled to refinery processing. Of the 0.01086458 lb/min benzene feed to the desalter, 0.01086406 lb/min (99.995%) are transferred to the oil. Benzene concentration in the desalter effluent water increases by 0.02%. 10 While particular embodiments of the invention have been described, it will be understood that the invention is not limited thereto since many modifications may be made, and it is, therefore, contemplated to cover by the appended claims any such modifications as fall within the true spirit and scope of the invention.

What is claimed is:

1. In a method for recovering hydrocarbon compounds from a contaminated wastewater comprising the steps of:

contacting the contaminated wastewater countercurrently with a stripping gas in a stripping zone, withdrawing stripping gas mixed with hydrocarbon compounds from the stripping zone, flowing said stripping gas and hydrocarbon compounds to a recovery zone wherein hydrocarbon compounds are adsorbed on an adsorption media, wherein the improvement comprises:

regenerating said adsorption media by;
  a) suspending flowing of stripping gas to said recovery zone,
  b) flowing regeneration steam to said recovery zone and recovering a steam condensate containing said hydrocarbon compounds,
  c) mixing said steam condensate with crude petroleum, thereby transferring said hydrocarbon compounds to the crude petroleum, and recovering said hydrocarbon compounds with the crude petroleum.

2. The method of claim 1 wherein said stripping gas is selected from the group consisting of air, nitrogen, carbon dioxide, methane, ethane, ethylene, propane, propylene, helium, hydrogen, neon, argon and mixtures thereof.

3. The method of claim 1 wherein said stripping gas is air.

4. The method of claim 1 wherein said adsorption media comprises activated carbon.

5. The method of claim 1 wherein said adsorption media comprises activated carbon having an adsorption capacity of 60 wt % to 65 wt % and a retentivity of 20 wt % to 26 wt %.

6. A method for recovering compounds from wastewater comprising the steps of:

passing a stripping gas through a stripping zone by means of a gas circulation means, contacting said contaminated wastewater countercurrent to said stripping gas in said stripping zone, withdrawing stripping gas mixed with volatile compounds from said stripping zone, flowing said stripping gas and volatile compounds to a recovery zone wherein volatile compounds are removed by adsorption media to produce regenerated stripping gas, passing said regenerated stripping gas to said gas circulation means thereby recycling said stripping gas to said stripping zone, regenerating said adsorption media by:
  a) suspending flowing of stripping gas to said recovery zone,
  b) flowing regeneration steam to said recovery zone and recovering a steam condensate comprising said volatile compounds,
  c) mixing said steam condensate with crude petroleum, thereby transferring said volatile compounds to said crude petroleum and recovering said volatile compounds with the crude petroleum.

7. The method of claim 6 wherein said stripping gas is selected from the group consisting of air, nitrogen, carbon dioxide, methane, ethane, ethylene, propane, propylene, helium, hydrogen, neon, argon and mixtures thereof.

8. The method of claim 6 wherein said stripping gas is air.

9. The method of claim 6 wherein said recovery zone comprises adsorption by activated carbon.

10. The method of claim 6 wherein said recovery zone comprises activated carbon having an adsorption capacity of 60 wt % to 65 wt % and a retentivity of 20 wt % to 26 wt %.

* * * * *